US012325239B2

(12) United States Patent
Butinya Teixido

(10) Patent No.: US 12,325,239 B2
(45) Date of Patent: Jun. 10, 2025

(54) PRINTING FLUID PRESSURE DETERMINATION

(71) Applicant: Hewlett-Packard Development Company, L.P., Spring, TX (US)

(72) Inventor: David Butinya Teixido, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 90 days.

(21) Appl. No.: 18/260,284

(22) PCT Filed: Feb. 5, 2021

(86) PCT No.: PCT/US2021/016782
§ 371 (c)(1),
(2) Date: Jul. 3, 2023

(87) PCT Pub. No.: WO2022/169458
PCT Pub. Date: Aug. 11, 2022

(65) Prior Publication Data
US 2024/0059069 A1 Feb. 22, 2024

(51) Int. Cl.
*B41J 2/175* (2006.01)

(52) U.S. Cl.
CPC .................................... *B41J 2/175* (2013.01)

(58) Field of Classification Search
CPC .... B41J 2/175; B41J 2/17506; B41J 2/17566; B41J 2/17596
See application file for complete search history.

(56) References Cited

U.S. PATENT DOCUMENTS

| | | | | |
|---|---|---|---|---|
| 6,398,329 | B1 | 6/2002 | Boyd et al. | |
| 6,435,638 | B1 | 8/2002 | Wilson et al. | |
| 6,454,375 | B2 | 9/2002 | Wilson et al. | |
| 6,467,861 | B1 | 10/2002 | Thielman et al. | |
| 6,988,793 | B2 | 1/2006 | Wilson et al. | |
| 9,994,036 | B2 | 6/2018 | Angulo Navarro et al. | |
| 10,252,524 | B1 * | 4/2019 | Slotto | B41J 2/16526 |
| 2013/0167568 | A1 * | 7/2013 | Park | F25B 25/02 62/127 |
| 2019/0337294 | A1 | 11/2019 | Butinya et al. | |

FOREIGN PATENT DOCUMENTS

| | | |
|---|---|---|
| JP | 2011-098490 A | 5/2011 |

* cited by examiner

*Primary Examiner* — Anh T Vo
(74) *Attorney, Agent, or Firm* — Jordan IP Law, LLC

(57) ABSTRACT

According to an example, a method to determine a printing fluid pressure in a printing fluid delivery system comprises: determining that a pressure difference measured by a fluid pressure sensor of the printing fluid delivery system is outside a dynamic range of the pressure sensor, controlling a fluid supply system of the printing fluid delivery system to increase a fluid pressure to an augmented fluid pressure in which the pressure difference is within the dynamic range of the pressure sensor, determining a fluid pressure value on the fluid pressure sensor, and calculating the printing fluid pressure as a function of the pressure difference and the augmented fluid pressure.

15 Claims, 4 Drawing Sheets

PRINTING FLUID PRESSURE DETERMINATION

BACKGROUND

Printing systems comprise a printing fluid delivery system to supply printing fluid to a printhead from a printing fluid supply, wherein the printhead is fluidly connected to the printing fluid delivery system through a fluid path. In these systems, the printing fluid delivery system may pressurize the fluid path in order to avoid issues such as the creation of bubbles within the fluid path, printhead drooling, or image quality defects during a printing operation.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
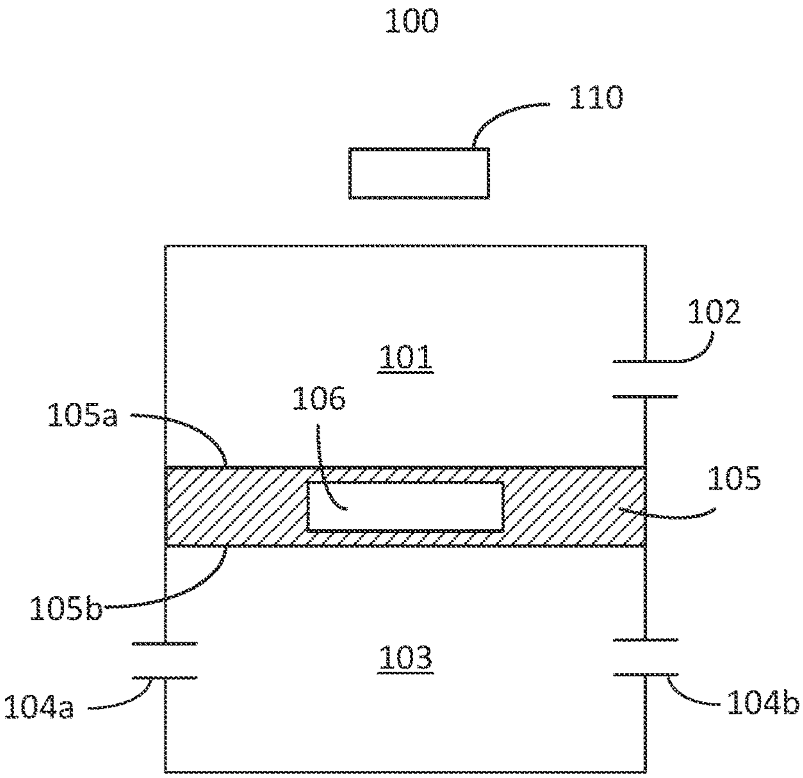
FIG. 1 shows a pressure sensor 100 to determine a printing fluid pressure, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Printing systems may comprise a series of printheads to dispense printing fluid on a print media. Such printing fluid may flow from fluid supplies to the series of printheads through a series of fluid paths, such as tubes or fluid lines. In order to supply the printing fluid to the series of printheads under operational conditions, printing systems include printing fluid delivery systems between the fluid supplies and the printheads. These printing fluid delivery systems may comprise elements such as intermediate tanks, pumps to increase a pressure of the printing fluid, and fluid supply systems to modify physical conditions of the printing fluid (for instance the printing fluid pressure).

If a printing system works outside predefined operational conditions, the printing system may experience issues such as printhead drooling, air ingestion through the nozzles of the printhead which may result in the creation of air bubbles within the fluid path, undesired degassing or precipitation of the printing fluid, printing fluid leakage, changes in the printing fluid viscosity, or exposure of the fluid delivery system to excessive levels of wear or fatigue. Hence, ensuring that the printing fluid pressure is within acceptable levels is important to assure a consistent, repeatable, and reliable performance of the printing system.

In order to determine the pressure of the printing fluid being delivered to their printheads, printing systems may comprise pressure sensors connected to the fluid paths. However, since the printing fluid may be chemically aggressive, some fluid pressure sensors may not be capable of determining the printing fluid pressure consistently during the whole lifespan of the printing system. Therefore, fluid pressure sensors may benefit from technical maintenance to withstand the printing system operations. Also, in some printing systems, sensors may be replaced more often as a consequence of the printing fluid characteristics and the number of print cycles to which the sensors are subjected.

An alternative approach to pressure determination is to rely on data associated with the devices which are responsible for moving the printing fluid to the printhead. For instance, printing fluid pressure may be calculated based on a characterization of a pump (or a similar element) that is to modify the pressure of the printing fluid. However, as print cycles are carried out within the printing system, the calculated printing fluid pressure may diverge from the actual pressure. Also, the characterization of the pump(s) may not consider electronic communications delays, fault conditions of the pump such as problems with the relief valve of the pump, aging of elements of the pump, the presence of obstacles that may partially block the fluid paths, pressure increases induced by external factors such as intermediate tanks located close by to the printing fluid delivery system, for instance. Hence, users and system that rely on characterization data may not obtain accurate measurements.

In order to determine the printing fluid pressure, devices, systems and methods including differential pressure sensors may be used. These differential pressure sensors may determine a printing fluid pressure based on a differential pressure measurement. Since some types of differential sensors have materials capable of withstanding chemically aggressive printing fluids, the usage of these differential pressure sensors provides means for determining a printing fluid pressure in consistent, reliable, and robust way.

According to an example, a printing fluid delivery system comprises an intermediate printing fluid receptacle having a printing fluid inlet and a fluid inlet, a fluid supply system to supply a fluid such as a gas at an operating fluid pressure, or reference pressure, through the fluid inlet, and a fluid pressure sensor fluidly connected to the printing fluid inlet and the fluid supply system. The fluid pressure sensor, which may have a limited range of measurement, is to measure a pressure difference between the reference fluid pressure and a printing fluid pressure. As a result of the limited range of measurement, the fluid pressure sensor has a saturation value beyond which the pressure differences are outside of the limited range. Hence, although the pressure difference may increase to beyond the saturation value, the fluid pressure sensor will in this case determine that the pressure difference is equal to the saturation value. In an example, the fluid supply system is to supply a gas at an operating gas pressure to the intermediate printing fluid receptacle the fluid inlet.

In other words, examples disclose a printer comprising a printing fluid delivery system having: a printing fluid delivery line such as a fluid path, a differential pressure measurement sensor to compare a printing fluid pressure in the printing delivery line with a reference pressure and a reference pressure sensor, the sensor having an unsaturated range, and a control mechanism to adjust the reference pressure so that the pressure measure by the sensor is within the unsaturated range and to determine the printing fluid pressure from the differential pressure measured by the sensor and the adjusted reference pressure. In an example, the reference pressure is adjusted by using a fluid supply system.

In some examples, the printer may further comprise a display to receive a user input. During an idle state of the printer, a diagnostic notification is to prompt on the display, and upon the diagnostic notification is accepted, the control mechanism is to determine if the printing fluid pressure is within an operational range. In an example, the idle state of the printer comprises periods of time in which the printing system is not performing a printing operation. Examples of idle states are a startup operation of the printer, a servicing operation of the printer, and a timeout operation of the printer.

As described above, the printing fluid delivery system may comprise a fluid supply system fluidly connected to the fluid pressure sensor. The fluid supply system is to supply a fluid (for instance a gas) at an operating fluid pressure to the intermediate printing fluid receptacle, wherein the fluid supply system comprises a fluid pressure sensor to determine the fluid pressure and a fluid pressure system to supply fluid. Additionally, the fluid supply system may comprise a fluid valve to provide means to reduce the fluid pressure supplied by the fluid supply system. In an example, the fluid supplied by the fluid supply system is a gas. The fluid supply system may be used to pressurize the intermediate printing fluid receptacle, wherein the receptacle comprises a first receptacle including printing fluid and a second receptacle including the fluid used to define the reference pressure. In an example, the first receptacle is within the second receptacle. In other examples, the first receptacle and the second receptacle are within a third receptacle. In some other examples, the first receptacle is a flexible bag and the second receptacle is a rigid receptacle, wherein the flexible bag including printing fluid is within the rigid receptacle so that an external surface of the flexible bag is contacting the gas.

As used herein, “printing fluid” refers generally to any substance that can be applied upon a substrate by a printer during a printing operation, including but not limited to inks, primers and overcoat materials (such as a varnish), water, and solvents other than water. According to some examples, the fluid pressure sensor comprises two chambers separated by a flexible element (which may comprise a membrane or resiliently deformable element). The flexible element may comprise a resiliently deformable material, for example synthetic rubber and may be to hold or retain a magnetic element such as a magnet. In order to hold the magnetic element, the flexible element may comprise a pocket, cavity or recess for retaining the magnetic element. The two chambers of the sensor may each be for receipt two different fluids. For example, one chamber may be for receipt of a fluid (for example, a gas such as air), and the other chamber may be for receipt of a fluid such as printing fluid. Hence, the flexible element that separates the two chambers is exposed to the pressures exerted by the fluids contained in each of the chambers. Since the flexible element comprises the magnetic element, a pressure differential between the chambers may result in movement of the magnetic element. For example, if the membrane is to separate a top and bottom chamber (referring to an orientation of the device in use), then, any change in pressure (e.g., rises and falls) may cause the flexible element to move up and/or down or closer to and/or further away from the top of the sensor.

To detect a pressure difference, the fluid pressure sensor may comprise an arrangement to detect a movement of the magnet by converting the distance between a sensor, such as a hall effect sensor, and the magnet to an electrical signal. More specifically, the magnetic field produced by the magnetic element will induce a voltage (or current) in the sensor and as the strength of the magnetic field at the sensor will vary depending on the position of the magnetic element and the voltage (or current) signal produced by the sensor will also vary depending on the position of the magnetic element. The sensor may output this signal, e.g., to another module such as a controller. In this way, the sensor is able to output an electrical reading directly proportional to the distance that the magnetic element has moved, and this reading may in turn be used to determine the differential pressure across the flexible element and/or the pressure of a fluid in one of the chambers of the device. In this way, the pressure sensor may determine the pressure of a fluid by receiving that fluid in one of the chambers and measuring the effect this has on the position of the magnet by examining the electrical signal determined by the sensor. In an example, the sensor comprises a Hall effect sensor and the sensor measurement is based on the voltage, e.g., potential difference, passing through a plate of the sensor (e.g., a voltage variation).

In an example, the first chamber of the pressure sensor receives a first fluid such as a gas and the second chamber receives a second fluid such as printing fluid. If the first fluid in the first chamber is kept at ambient pressure then the direct pressure of the fluid in the second chamber may be measured directly (from the signal of the sensor). However, if the pressure is different to ambient, then the differential pressure measured by the sensor may be used to calculate the pressure of the second printing fluid based on the signal associated with the differential pressure measured by the sensor and the pressure of the first fluid: the reference pressure. As used herein, the term “reference pressure” will be used to refer to the pressure of the fluid contained in the first chamber.

Referring now to FIG. 1, a pressure sensor 100 is shown. The pressure sensor 100 comprises a first chamber 101 and a second chamber 103, wherein the first chamber 101 comprises an inlet 102. The inlet 102 may comprise a valve (not shown) to permit the entry of first fluid into the first chamber 101. In an example, a fluid supply system is fluidly connected to the inlet 102. The second chamber 103 comprises a first port 104*a* and a second port 104*b*, wherein the ports may comprise valves to permit the entry and the exit of a second fluid from the second chamber 103. In an example, the first port 104*a* is the inlet of the second chamber 103 and the second port 104*b* is the outlet of the chamber 103. The pressure sensor 100 further comprises a flexible element 105 having a first side 105*a* and a second side 105*b*, wherein the first side 105*a* forms a wall of the first chamber 101 and the second side 105*b* forms a wall of the second chamber 103. Hence, the first chamber 101 and the second chamber 103 are each defined, at least in part, by the flexible element 105. As described above, the flexible element 104 is to retain a magnet 106. The pressure sensor 100 further comprises a sensor 110 to detect the position of the magnet 106 relative to the sensor 110 so that a movement of the magnet 106 is translated into a pressure difference between the first chamber 101 and the second chamber 103.

In FIG. 1, the sensor 110 is disposed above the printing fluid sensor 100 such that the first chamber 101 is between the sensor 110 and the flexible element 105. Therefore, the sensor 110 is disposed such that the first chamber 101 is between the magnet 106 (when the magnet 106 is received in the flexible element 105) and the flexible element 105. Hence, when there are pressure changes across the flexible element 105, the magnet 106 may move up and/or into the first chamber 101. When the first chamber 101 is filled with a fluid (e.g., a gas), such as a pressurized fluid (e.g., pressurized gas or pressurized air), an increase in the pressure in the second fluid (e. g. printing fluid) in the second chamber 103 will cause the magnet 106 move upwards, acting against the pressure exerted against the magnet 106. As stated above, these movements of the magnet 106 cause changes in a surrounding magnetic field which are detected by the sensor 110. However, in other examples, alternative locations for the sensor 110 may be possible.

If the second fluid is printing fluid, since the pressure sensor 100 indirectly determines a printing fluid pressure within the second chamber 103 by determining a movement caused by a difference in pressures between the first chamber 101 and the second chamber 103, the printing fluid pressure is a function of the first fluid pressure and the pressure difference determined by the sensor 100. Hence, as a result of a limited resolution of the sensor 100, the range of measurements of the pressure sensor 100 may be limited to a fixed range when maintaining one of the gas pressure and the printing fluid pressure constant. The fixed range may be alternatively referred to as unsaturated range. If the measurements determined by the sensor 100 exceed the fixed range, the sensor 100 enters into a saturation state in which the pressure difference determined by the sensor 100 is equal to a saturation value, i.e., a maximum pressure difference. However, if one of the first fluid pressure and the printing fluid pressure is modified, the fixed range of measurements of the pressure sensor 100 changes, thereby providing a dynamic range for the measurements. For instance, in case of modifying the fluid pressure with a fluid supply system, the dynamic range of pressure difference measurements (and hence the range for the printing fluid pressure measurements) is obtained for the sensor 100. If the printing fluid that is provided to the chamber through the first port 104*a* has a constant printing fluid pressure, the sensor 100 is able to determine such printing fluid pressure if the sensor 100 is in the unsaturated state. Hence, in order to read and determine accurate measurements with the sensor 100, the sensor 100 has to be in an unsaturated state in which the printing fluid pressure of the printing fluid within the second chamber 103 can be determined based on a function of the pressure difference determined the sensor 100 and the first fluid pressure (a gas pressure for instance).

According to some examples, the second chamber 103 is connected to a fluid path through the first port 104*a* and the second port 104*b* so that a printing fluid pressure is determined based on the readings of the sensor 100.

Figure 2:
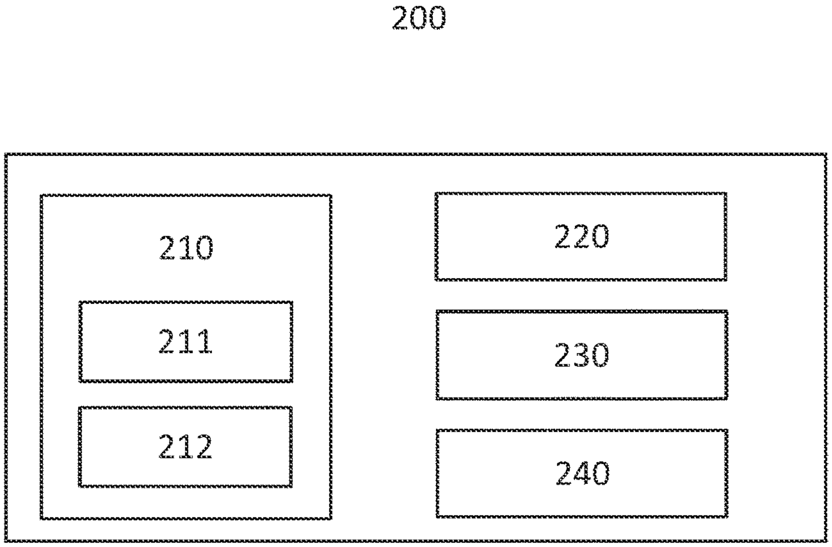
FIG. 2 shows a printing fluid delivery system, according to an example of the present disclosure.

Referring now to FIG. 2, a printing fluid delivery system 200 is shown. The printing fluid delivery system 200 comprises an intermediate printing fluid receptacle 210, a fluid supply system 220, a differential fluid sensor 230, and a controller 240. In some examples, the intermediate printing fluid receptacle 210 may be positioned between a printing fluid supply to supply printing fluid and a printhead. The intermediate receptacle 210 comprises fluid 211 having an operating pressure and printing fluid 212 having a printing fluid pressure. The fluid supply system 220, which is fluidly connected to the intermediate receptacle 210 and the differential sensor 230, is to modify the operating pressure of the fluid 211 within the intermediate receptacle 210. The differential fluid sensor 230 is to measure a pressure difference between the printing fluid pressure and the operating pressure, wherein the sensor comprises a measurement range. If the pressure difference is outside the measurement range, the sensor 230 enters into a saturated state. In an example, the sensor 230 is the sensor 100 previously explained in reference with FIG. 1, wherein the measurement range corresponds to a dynamic range of measurements.

During the saturated state, the sensor 230 determines a pressure difference equal to a saturation value even though the pressure difference between pressures has increased beyond such saturation value. The controller 240, which is in communication with the fluid supply system 220 and the sensor 230, is to execute actions to determine the printing fluid pressure based on the readings of the sensor 230 and the fluid pressure. In order to obtain the printing fluid pressure, the controller 240 is to check if the sensor 230 is in the saturated state. In an example, the determination is performed by determining a steady behavior in the pressure difference readings while changing the fluid pressure with the fluid supply system 220. In other examples, the determination is performed by determining that the pressure reading is equal to a saturation value of the sensor 230. Upon determination that the sensor 230 is in a saturated state, the controller 230 is to increase the operating pressure to an increased pressure in which the sensor 230 enters into an unsaturated state. The operating pressure is increased by controlling the fluid supply system 220 to increase the fluid pressure. As previously explained, the fluid supply system 220 may be a gas supply system to supply gas at an operating pressure. In an example, the sensor 230 returns to the unsaturated state once the pressure difference measured by the sensor is different to the saturation value. In other examples, the sensor 230 enters into the unsaturated state once the behavior in the pressure difference is not steady. Then, with the sensor 230 in the unsaturated state, the controller 240 is to determine the printing fluid pressure based on the increased pressure and a second pressure difference measured difference measured with the sensor in the unsaturated state. On the other hand, if the sensor 230 determines that the sensor 230 is in the unsaturated state, the printing fluid pressure may be calculated from the readings even though the sensor 230 has not saturated. In an example, if the controller 240 determines that sensor 230 is not saturated, the sensor 230 can determine the printing fluid pressure based on the fluid pressure and the differential pressure determine by the sensor 230.

In other examples, the controller 240 is further to determine an upcoming operation for the printing fluid delivery system 200 and to modify, with the fluid supply system 220, the fluid pressure to a second operating pressure based on the upcoming operation. By modifying the fluid pressure, the reference pressure of the sensor 230 is modified.

In some other examples, the intermediate receptacle 210 comprises a printing fluid inlet fluidly connected to the printing fluid supply, a fluid inlet fluidly connected to the fluid supply system 220, and an outlet fluidly connected to the printhead. As previously described, the intermediate receptacle 210 may comprise a flexible receptacle to store printing fluid 212 so that the fluid 211 (e.g., gas) contacts an external surface of the flexible receptacle.

According to some examples, a method to determine a printing fluid pressure in a printing fluid delivery system may be used. The printing fluid delivery system may comprise an intermediate printing fluid receptacle, a fluid supply system to supply a fluid at an operating fluid pressure, and a differential pressure sensor fluidly connected to a printing fluid inlet of the printing fluid receptacle and the fluid supply system. The method may comprise actions to determine the printing fluid pressure in case of having a differential sensor having a dynamic range. In an example, the printing fluid delivery system is the printing fluid delivery system 200 previously explained in FIG. 2.

Figure 3:
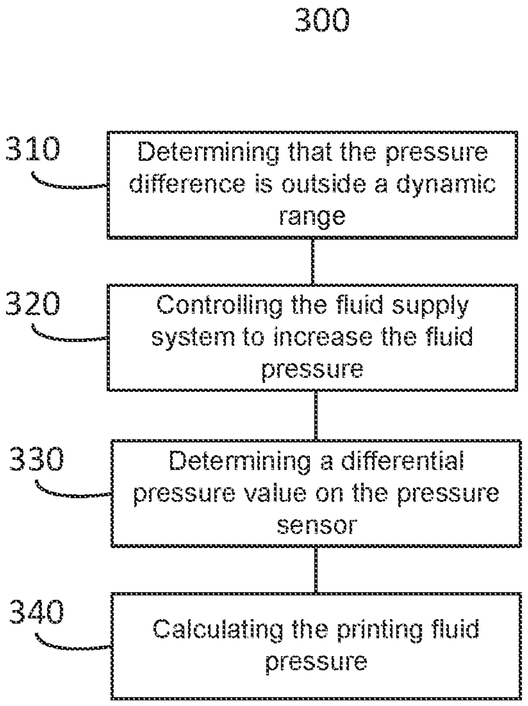
FIG. 3 shows a method to determine a printing fluid pressure, according to an example of the present disclosure.

Referring now to FIG. 3, a method 300 to determine a printing fluid pressure in a printing fluid delivery system is shown. Method 300 may be performed to determine the printing fluid pressure in a printing fluid delivery system comprising a differential pressure sensor having a dynamic range of measurements, for instance the pressure sensor 100 of FIG. 1. In an example, the printing fluid delivery system comprises an intermediate printing fluid receptacle, a fluid supply system to supply a fluid such as a gas at an operating fluid pressure, and a differential pressure sensor fluidly connected to a printing fluid inlet of the printing fluid receptacle and the fluid supply system. As previously explained in reference to other examples, the fluid pressure sensor measures a pressure difference between the fluid pressure and the printing fluid pressure and has a dynamic range for the measurements, i.e., a maximum pressure difference measurement between the printing fluid pressure and the gas pressure. If the pressure difference is within the dynamic range, the printing fluid pressure can be determined based on the readings of the differential pressure sensor and the fluid pressure. However, if the pressure difference is outside the range, the printing fluid pressure cannot be accurately determined. At block 310, method 300 comprises determining that the pressure difference is outside the dynamic range of the fluid pressure sensor. In an example, the pressure difference is considered to be outside of the dynamic range if the pressure difference is equal to a saturation value of the sensor, i.e., the maximum pressure difference that can be determined with the sensor. At block 320, method 300 comprises controlling the fluid supply system to increase the fluid pressure to an augmented fluid pressure in which the pressure difference is within the dynamic range of the pressure sensor. At block 330, method 300 comprises determining a fluid pressure value on the differential pressure sensor. Since the pressure difference is within the dynamic range of the fluid pressure sensor, the pressure difference is below the saturation value of the sensor. Then, at block 340, method 300 comprises calculating the printing fluid pressure as a function of the fluid pressure value and the augmented fluid pressure. Since the fluid pressure sensor has entered an unsaturated state, the printing fluid pressure is determined based on the fluid pressure value and the augmented fluid pressure.

In some examples, method 300 further comprises controlling the fluid supply system to modify the augmented fluid pressure back to the operating fluid pressure once the calculation of the printing fluid pressure has been performed. In some other examples, calculating the printing fluid pressure as a function of the fluid pressure value and the augmented fluid pressure comprises aggregating the fluid pressure value with the augmented fluid pressure.

In some other examples, the method 300 further comprises determining if the printing fluid pressure is within an operational range and prompting a warning notification if the printing fluid pressure is outside the operational range. In an example, the warning notification is prompted on a display. In other examples, the data associated with the warning notification is sent to a processor that is to inform to a user of the printing fluid delivery system that the system is under pressurized or over pressurized. The user, in view of the status of the system, may consider running deeper diagnostics to find out the origin of the under pressure of over pressure.

According to some examples, method 300 is performed during an idle state of the printing fluid delivery system. The idle state of the printing fluid delivery system may correspond with an idle state of a printing system, i.e., a period of time in which the printing system is not performing a printing operation. In some examples, the idle state of the printing fluid delivery system comprises at least one of a startup operation of the printing system, a servicing operation of the printing system, and a timeout period of the printing system. The startup operation of the printing system may be a period of time in which the printing system is pressurized as a part of a startup routine. The servicing operation of the printing system may be a period of time in which the printing system is performing servicing actions. The timeout period of the printing system may be a period of time in which printing fluid delivery system of the printing system is still pressurized but the printing operation has been already performed.

Figure 4:
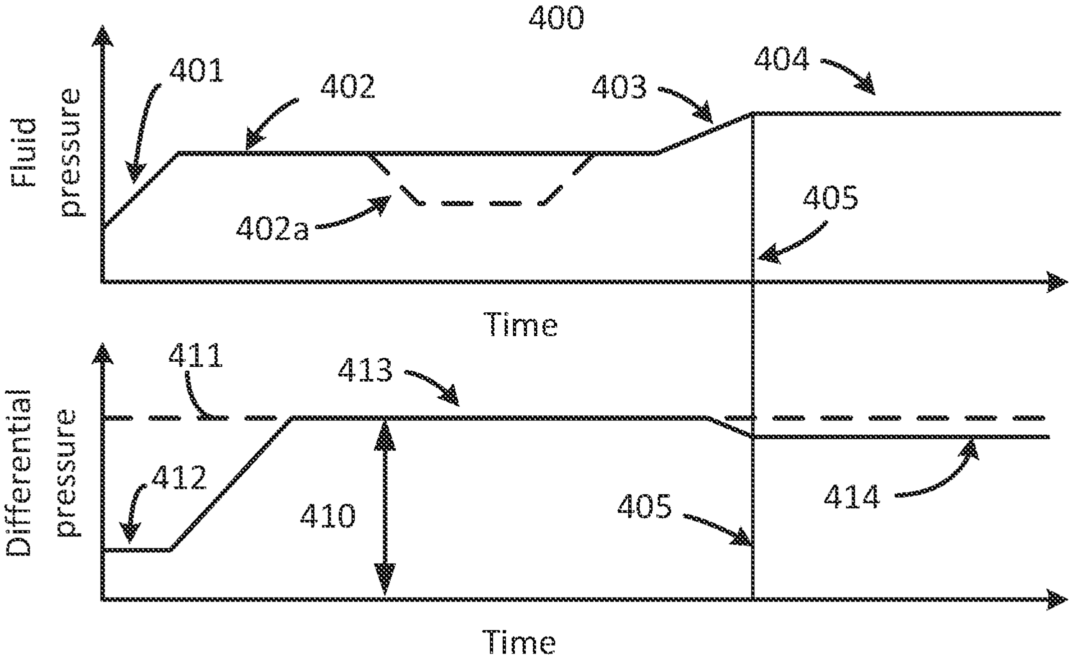
FIG. 4 shows line charts representing pressures over a period of time, according to an example of the present disclosure.

Referring now to FIG. 4, line charts 400 representing pressures over a period of time are shown. The line charts 400 comprise a first line chart representing a fluid pressure over a period of time and a second line chart representing a differential pressure over a period of time. It should be understood that, although not represented in the same line chart, the X-axis of both line charts is the same, i.e., represent the same period of time. However, for clarity purposes, the line charts 400 have been represented separately, i.e., using separated Y-axis.

The upper line chart of the line charts 400 represents the fluid pressure over a period of time. The fluid pressure may correspond to the pressure of the fluid supplied by a fluid supply system. The fluid supply system may include a fluid pressure sensor to determine the pressure of the fluid that is being supplied. The fluid pressure represented in the upper line chart can be divided into different stages. A first stage comprises a first fluid pressure increase 401 which may correspond to a pressurization of a printing fluid delivery system, for instance an intermediate receptacle of the printing fluid delivery system. During the pressurization, the fluid pressure is increased so as to obtain an operating pressure in accordance with the upcoming operation. Following the first fluid pressure increase 401, the fluid pressure remains constant in a first operating pressure 402. At a certain time, the fluid pressure experiences a second fluid pressure increase 403 until the fluid pressure reaches an augmented fluid pressure 404 at a time 405.

The lower line chart of the line charts 400 represents a differential pressure over a period of time. The differential pressure may be obtained, for instance, from a differential pressure sensor, i.e., a sensor to measure a difference between a printing fluid pressure and the fluid pressure. In an example, the differential pressure sensor may be the pressure sensor 100 or the differential pressure sensor 230. In contrast to the fluid pressure of the first line chart, the sensor pressure has a dynamic range 410 for the measurements, and therefore, the differential pressure measurements may not represent an actual pressure difference between a printing fluid pressure and the fluid pressure if the differential pressure sensor has entered into a state in which the sensor is saturated. Initially, in the lower line chart, the differential pressure is a pressure difference 412 within the range 410. Over time, the sensor pressure may reach a pressure measurement 413 equal to a saturation value 411. For example, the sensor may saturate because of electronic delays for the control of one of the fluid supply system and the pump, because an increase of the printing fluid pressure over the requirements, or faulty parts of the system. Upon reaching the pressure measurement 413, the sensor enters into a saturated state in which it cannot measure values beyond the saturation value, and hence, if the printing fluid pressure (which is obtainable from the differential pressure) is outside the operational ranges, neither the printing fluid delivery system nor the user won't know the actual state of the printing fluid pressure. Even the fluid pressure suffers a depressurization 402*a* while being in the first operating pressure 402, the differential pressure read by the sensor will remain the same.

However, the differential sensor can return to the unsaturated state if the differential pressure falls within the values defined by the range 410. Hence, as previously explained in reference with FIGS. 1, 2 and 3, the fluid pressure may be increased in order to determine the pressure difference between the printing fluid pressure and the fluid pressure, i.e., the fluid pressure is used as reference pressure. In the example of FIG. 4, the sensor is brought back to the unsaturated state by performing the second fluid pressure increase 403, which enables the sensor pressure to achieve a sensor pressure measurement 414 which is within the range 410 at the time 405. Once the sensor pressure is determined to be below the saturation value, the increase of the fluid pressure is stopped. In some examples in which the resolution of the sensor is lower, the fluid pressure may be further increased until the sensor pressure is determined to be within the range 410. Then, the printing fluid pressure can be calculated based on the sensor pressure measurement 414 and the augmented fluid pressure 404. In an example, the printing fluid pressure is calculated as a function of the sensor pressure measurement 414 and the augmented fluid pressure 404. In other examples, the printing fluid pressure is calculated as a difference between the pressure measurement 414 and the augmented fluid pressure 404.

According to some examples, the augmented fluid pressure 404 may be modified upon the printing fluid pressure has been determined. In an example, an upcoming operation for the printing fluid delivery system is determined and the fluid pressure is modified to a second operating pressure based on the upcoming operation. In other examples, the printing fluid pressure may be compared with an operational printing fluid range. If the printing fluid pressure is outside the operational printing fluid range, a notification may be triggered by the system.

Figure 5:
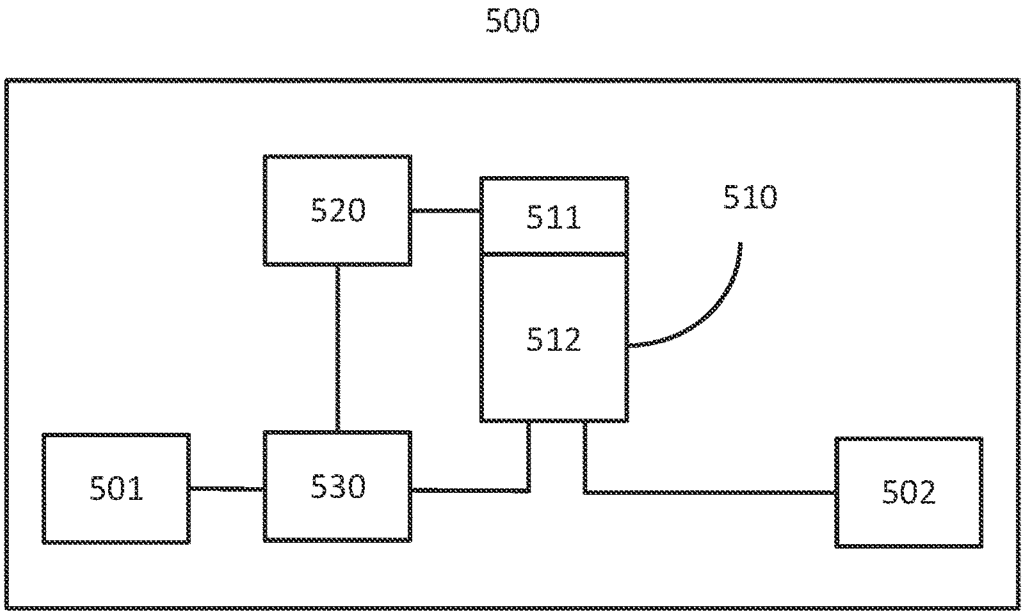
FIG. 5 shows a printer comprising a printing fluid supply, a printing fluid delivery system and a printhead, according to an example of the present disclosure.

Referring now to FIG. 5, a printer 500 is shown. The printer 500 may be, for instance, a large format printer. The printer 500 comprises a printing fluid supply 501, a printhead 502, and a printing fluid delivery system. The printing fluid delivery system comprises an intermediate tank 510, a fluid supply system 520, a differential sensor 530 to measure a pressure difference between the printing fluid pressure and a fluid pressure, and a controller (not shown in FIG. 5). The intermediate tank 510, which may correspond to one of the intermediate receptacles previously described in reference to other examples, comprises fluid 511 and printing fluid 512. The differential sensor 530, which has a dynamic range for the measurements, has a saturated state and an unsaturated state, wherein during the unsaturated state the sensor 530 determines a pressure difference within the dynamic range and during the saturated state the sensor 530 determines a pressure difference equal to a saturation value. As previously explained in reference to FIGS. 1 to 4, the differential sensor 530 is to determine the printing fluid pressure based on the pressure difference and the fluid pressure.

In the example of FIG. 5, the differential sensor 530 is fluidly connected to the printing fluid supply 501 through a fluid path, wherein the sensor 530 is connected in the fluid path between the printing fluid supply 501 and the intermediate tank 510. However, in other examples, the sensor 530 may be connected to a second fluid path from the intermediate tank 510 to the printhead 502. The fluid supply system 520, which is to pressurize the printing fluid delivery system, is fluidly connected to the intermediate tank 510 and the sensor 530. In other examples, the printer 500 may comprise a pump between the printing fluid supply 501 and the intermediate tank 510. The intermediate tank 510 comprises a fluid inlet in which the fluid supply system 520 is connected, a printing fluid inlet in which the fluid path carrying printing fluid from the printing fluid supply 501 is connected, and a printing fluid outlet in which the second fluid path that is fluidly connected to the printhead 502 is connected.

According to some examples, during an idle state of the printer 500, the controller of the printing fluid delivery system determines the printing fluid pressure based on the readings of both the fluid supply system 520 and the sensor 530. If the sensor 530 is saturated, the printing fluid delivery system may perform the method 300 previously explained in reference with FIG. 3 to determine the printing fluid pressure. Examples of idle states of the printer comprise a servicing operation in which no printing operation is being performed, a startup operation to prepare the printer 500 for an upcoming printing operation, and a timeout period after a printing operation has been performed in the printer 500.

According to some other examples, the printer 500 may further comprise a screen. Once the printing fluid pressure has been determined, the printing fluid pressure is compared with an operational range. If the printing fluid pressure is outside the operational range, a notification is displayed on the screen of the printer 500.

Figure 6:
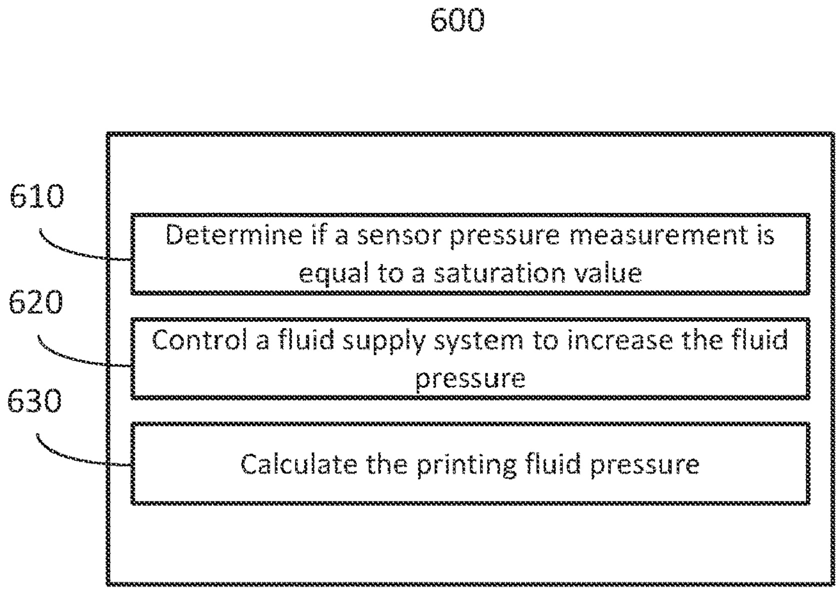
FIG. 6 shows a computer-readable medium comprising instructions, according to an example of the present disclosure.

Referring now to FIG. 6, a computer-readable medium 600 comprising instructions is shown. The instructions, when executed by a processor, cause a system to execute a series of actions. In an example, the system may be a printing fluid delivery system such as the printing fluid delivery system 200 of FIG. 2. Examples of computer-readable mediums include a hard drive, a random access memory (RAM), a read-only memory (ROM), memory cards and sticks and other portable storage devices. The instructions, when executed by the processor, cause the system to determine (at block 610) if a sensor pressure measurement is equal to a saturation value, the sensor pressure measurement being a difference between a printing fluid pressure and a fluid pressure, to control (at block 620) a fluid supply system to increase the fluid pressure to an increased fluid pressure in which the sensor pressure measurement is below the saturation value, and to calculate (at block 630) the printing fluid pressure, wherein the calculation includes an aggregation of the increased fluid pressure with the sensor pressure measurement. In an example, the sensor pressure measurement is captured by a differential sensor such as the pressure sensor 100 of FIG. 1 and the differential fluid sensor 230 of FIG. 2.

In other examples, the instructions stored in the computer-readable medium 600 may further cause a system to determine if the system is in an idle state. If the system is in not in the idle state, the processor may prevent the execution of the instructions. In some other examples, the computer-readable medium 600 comprises further instructions to cause the system to read an operation pipeline of the system, and control the fluid supply to modify the increased pressure to an upcoming pressure based on an upcoming operation of the operation pipeline upon the printing fluid pressure is calculated.

According to some examples, the computer-readable medium may comprise instructions to prompt a diagnostic notification that is to be accepted by a user of the system. If the user accepts the notification, the processor may execute instructions to determine if the printing fluid pressure is within an operational range of pressures.

Figure 7:
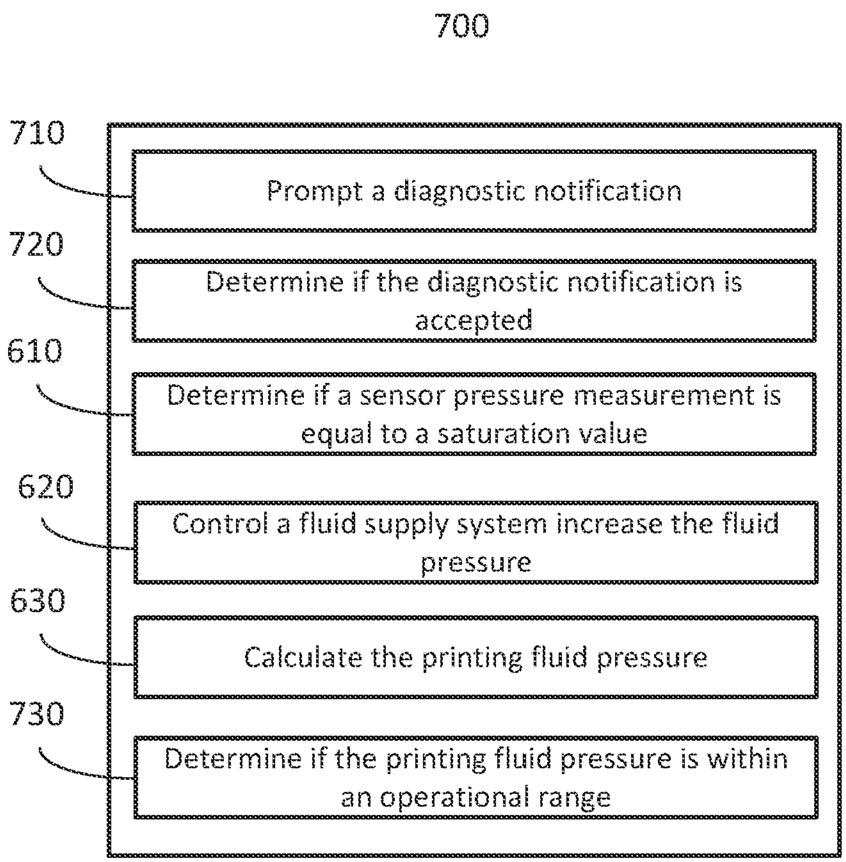
FIG. 7 shows a computer-readable medium comprising instructions to determine if the printing fluid pressure is within an operational range, according to an example of the present disclosure.

Referring now to FIG. 7, a computer-readable medium 700 comprising instructions to prompt a diagnostic notification is shown. As previously explained in reference to FIG. 6, the computer-readable medium 700 comprises instructions, that when executed by a processor, cause a system to determine a printing fluid pressure based on the measurements of a differential sensor. However, the computer-readable medium 700 comprises further instructions to prompt a diagnostic notification that, if accepted, triggers the calculation of the printing fluid pressure. The instructions, at block 710, prompt a diagnostic notification on a display of the system. At block 720, the system is to determine if the diagnostic notification is accepted. Then, the instructions cause the system to execute the blocks 610, 620 and 630 previously explained in reference to FIG. 6, i.e., determine if a sensor pressure measurement is equal to a saturation value (at block 610), control a fluid supply system to increase the fluid pressure to an increased fluid pressure (at block 620), and calculate the printing fluid pressure (at block 630). Upon the printing fluid pressure has been calculated, the instructions cause the system to determine if the printing fluid pressure is within an operational range at block 730.

According to some examples, the printing fluid pressure may be determined to be outside the operational range. Being outside the operational range, the system may suffer from operational defects which may have a negative impact on the performance of the system. In some examples, an overpressure may cause printing fluid leakage in some of the elements of the system, excessive fatigue in some of the element of the system, or a drooling effect generated by the excess of pressure within the printhead. In the same way, an under pressure may cause an air ingestion through the nozzles of the printhead or faulty dispensing printing fluid through the nozzles of the printhead. Hence, running diagnostics to determine the status of the printing fluid pressure enables a user to determine a fault condition of the system before experiencing the results of the condition during the printing operation, thereby saving time to the user and providing a more efficient usage of the resources of the system.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A method to determine a printing fluid pressure in a printing fluid delivery system comprising:

an intermediate printing fluid receptacle having a printing fluid inlet and a fluid inlet;

a fluid supply system to supply a fluid at an operating fluid pressure through the fluid inlet; and a fluid pressure sensor fluidly connected to the printing fluid inlet and the fluid supply system, wherein the fluid pressure sensor measures a pressure difference between the fluid pressure and a printing fluid pressure, the method comprising:

determining that the pressure difference is outside a dynamic range of the fluid pressure sensor;

controlling the fluid supply system to increase the fluid pressure to an augmented fluid pressure in which the pressure difference is within the dynamic range of the pressure sensor;

determining a fluid pressure value on the fluid pressure sensor; and calculating the printing fluid pressure as a function of the pressure value and the augmented fluid pressure.

2. The method of claim 1, the method further comprising:

controlling the fluid supply system to modify the augmented fluid pressure back to the operating fluid pressure once the calculation of the printing fluid pressure has been performed.

3. The method of claim 1, wherein the method is performed during an idle state of the printing fluid delivery system.

4. The method of claim 3, wherein the idle state comprises at least one of:

a startup operation of a printing system a servicing operation of the printing system; and a timeout period of the printing system.

5. The method of claim 1, wherein calculating the printing fluid pressure as a function of the printing fluid pressure value and the augmented fluid pressure comprises aggregating the fluid pressure value with the augmented fluid pressure.

6. The method of claim 1, wherein the method further comprises:

determining if the printing fluid pressure is within an operational range; and prompting a warning notification if the printing fluid pressure is outside the operational range.

7. A large format printer comprising:

a printing fluid supply;

a printhead; and the printing fluid delivery system of claim 6 fluidly connected to the printing fluid supply through a fluid path, wherein the sensor is connected to the fluid path.

8. The large format printer of claim 7, wherein during an idle state of the printer, the controller determines the printing fluid pressure based on the increased pressure and a second pressure difference.

9. A printing fluid delivery system comprising:

an intermediate tank between a printing fluid supply and a printhead, the intermediate tank comprising:

fluid having an operating pressure; and printing fluid having a printing fluid pressure;

a fluid supply system fluidly connected to the intermediate tank;

a sensor to measure a pressure difference between the printing fluid pressure and the operating pressure; and a controller to:

check if the sensor is in a saturated state;

upon determination that the sensor is in a saturated state, increase the operating pressure to an increased pressure in which the sensor enters into an unsaturated state; and determine the printing fluid pressure based on the increased pressure and a second pressure difference measured with the sensor in the unsaturated state.

10. The system of claim 9, wherein the intermediate tank comprises:

a printing fluid inlet fluidly connected to the printing fluid supply;

a fluid inlet fluidly connected to the fluid supply system; and an outlet fluidly connected to the printhead.

11. The system of claim 9, wherein:

the printing fluid is stored within a flexible receptacle of the intermediate tank; and the fluid contacts an external surface of the flexible receptacle.

12. The system of claim 9, wherein the controller is further to:

determine an upcoming operation for the printing fluid delivery system; and modify, with the fluid supply system, the fluid pressure to a second operating pressure based on the upcoming operation.

13. A printer comprising a printing fluid delivery system having:

a printing fluid delivery line;

a differential pressure measurement sensor to compare a printing fluid pressure in the printing fluid delivery line with a reference pressure, and a reference pressure, the sensor having an unsaturated range; and a control mechanism to adjust the reference pressure so that the pressure measure by the sensor is within the unsaturated range and to determine the printing fluid pressure from the differential pressure measured by the sensor and the adjusted reference pressure.

14. The printer of claim 13, further comprising a display to receive a user input, wherein:

during an idle state of the printer, a diagnostic notification is to prompt on the display, and upon the diagnostic notification is accepted, the control mechanism is to determine if the printing fluid pressure is within an operational range.

15. The printer of claim 14, wherein the idle state comprises at least one of:

a startup operation of the printer;

a servicing operation of the printer; and a timeout period of the printer.

* * * * *